R. OKRASSA.
COFFEE SEPARATOR.
APPLICATION FILED AUG. 10, 1911.
1,029,624. Patented June 18, 1912.
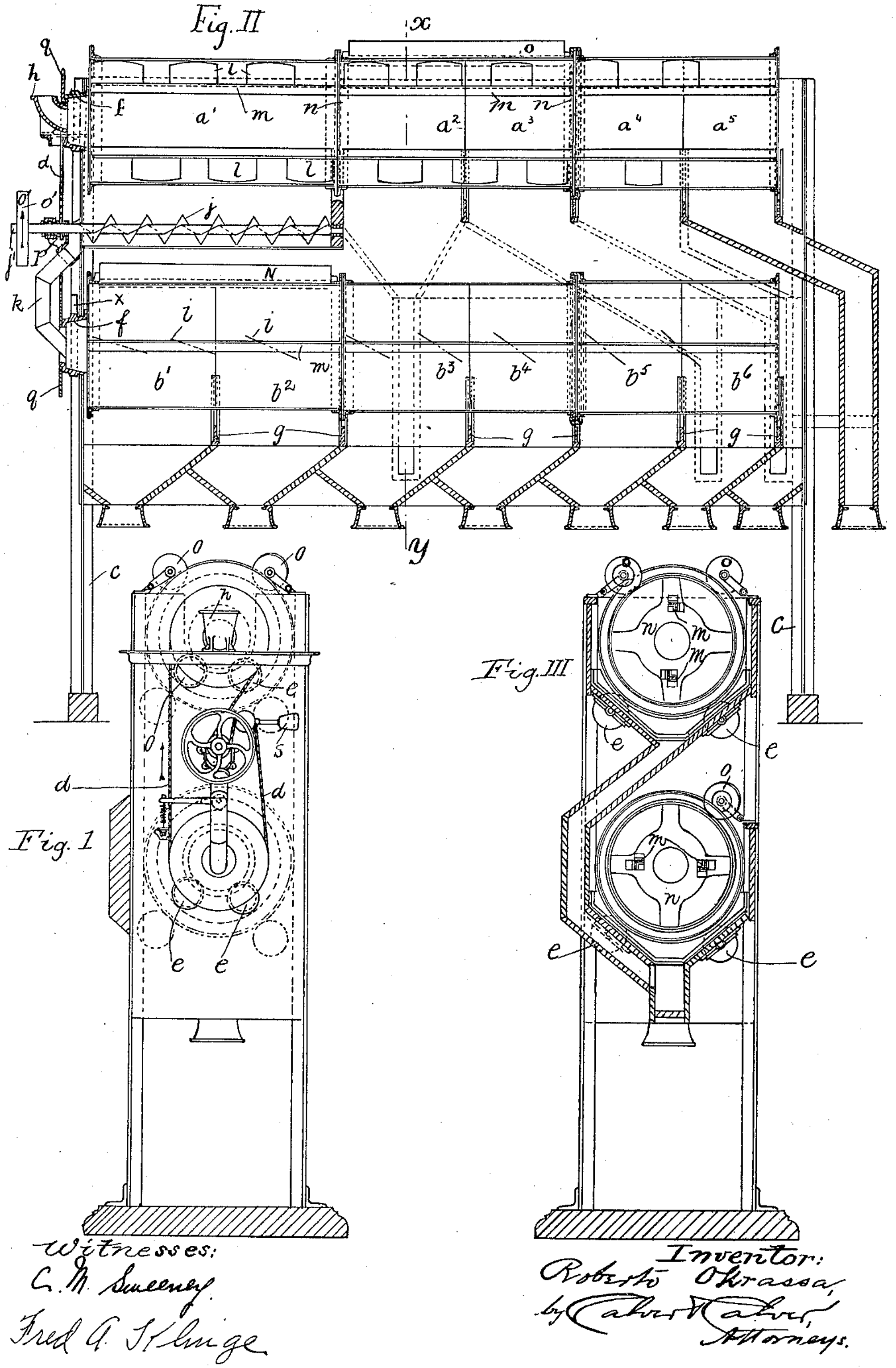
Fig. II, Fig. 1, Fig. III
Witnesses:
C. M. Sweeney
Fred A. Klinge
Inventor:
Roberto Okrassa,
by Calver & Calver,
Attorneys.
COLUMBIA PLANOGRAPH CO., WASHINGTON, D. C.

UNITED STATES PATENT OFFICE.

ROBERTO OKRASSA, OF ANTIGUA, GUATEMALA.

COFFEE-SEPARATOR.

1,029,624. Specification of Letters Patent. Patented June 18, 1912.

Application filed August 10, 1911. Serial No. 643,346.

*To all whom it may concern:*

Be it known that I, ROBERTO OKRASSA, a subject of the German Emperor and King of Prussia, and residing at Antigua, Guatemala, Central America, have invented certain new and useful Improvements in Coffee-Separators, of which the following is a specification.

This invention relates to a coffee separator comprising a rotary cylinder or cylinders divided into a plurality of sections having perforations of different size, the cylinder or cylinders being provided with paddles, so that coffee entering the interior of the cylinder or each cylinder is propelled along it by the paddles, and, falling through the different perforations into chutes, is delivered into separate bags.

The invention consists in certain features of construction hereinafter more particularly described and pointed out in the claims.

In the accompanying drawings which illustrate a preferred embodiment of the invention, Figure I is an end view; Fig. II a part vertical section part side elevation; Fig. III a transverse section through the line *x*—*y* of Fig. II.

Referring to the drawings, the separator shown comprises two cylinders *a* and *b*, the upper cylinder consisting of sections $a^1$, $a^2$, $a^3$, $a^4$ and $a^5$ or more, and the lower cylinder consisting of sections $b^1$, $b^2$, $b^3$, $b^4$, $b^5$ and $b^6$ or more, mounted on a suitable framework *c*, and driven, in the construction shown, by a pitch chain *d*. The cylinders are each supported by rollers *e* arranged in pairs, one pair on the front plate of the framework *c*, on which pair the end casting *f* revolves, and the other pair in the rear. Division castings *g* are provided, to prevent the remixing of the coffee which has fallen through the various sections.

A hopper *h* is provided at the inlet end of the upper cylinder and serves to receive the coffee which passes through the conical end casting *f* to the first section $a^1$. The section $a^1$ is perforated in such wise that about one half of the incoming charge falls through, a conveyer *j* located below the compartment $a^1$ serving to convey such portion of the charge to a chute *k* by which it is delivered to the lower cylinder *b*. The remainder of the coffee in the upper cylinder is passed along over the perforated sections $a^2$, $a^3$, $a^4$, $a^5$ by means of inclined paddles *l* secured to longitudinal angle irons *m* fastened to division plates *n*. These division plates *n*, as more clearly shown in Fig. III, are of such form as, while retarding the travel of the coffee somewhat, will permit the successful discharge of the coffee from one compartment to the next. The "giant" coffee which will not pass through the perforations falls over the end of the cylinder *a* and is caught as it issues from an opening in the end plate.

The coffee in the lower cylinder *b* is separated in a similar way and is delivered into bags in the usual manner. The coffee from the sections $a^2$ and $a^3$ of the upper cylinder mingles with the coffee from the sections $b^3$ and $b^6$ respectively; while the coffee from the section $a^4$ of the upper cylinder mingles with the coffee which passes over the end of the lower cylinder.

In order that any coffee adhering in the perforations may be dislodged revolving brushes *o* are provided.

The machine shown is driven by a pulley $o^1$ secured to the conveyer shaft $j^1$ and to this shaft is secured a chain wheel *p* which transmits its motion through the chain *d* to the chain wheels *q* fastened to the conical end castings *f*, thus imparting a rotary motion to the separator cylinders. A retaining roller *r* is provided to keep the lower cylinder in place, while any slackness in the chain is taken up by a weighted lever *s* (Fig. I) or other suitable tension device.

Owing to the fact that the cylinders *a* and *b* are loosely mounted on the supporting rollers *e*, the said cylinders will be jarred or vibrated more or less as they are rotated, so as to effect a much better separation of the coffee than has heretofore been obtained in separators comprising perforated cylinders revolving in fixed bearings.

What I claim is:—

1. In a coffee separator, the combination with two loosely mounted cylinders, one arranged above the other and both revolving on rollers, said cylinders being divided into compartments, having perforations of different sizes, by division plates which permit the successive discharge of the coffee from one compartment to the next, and the first or inlet compartment of the upper cylinder being so perforated as to discharge about half of the incoming coffee, a receiving compartment below said first or inlet compartment of said upper cylinder, a conveyer in said receiving compartment, and a chute connecting said receiving compartment with the first or inlet compartment of the lower cylinder.

2. In a coffee separator, the combination with two loosely mounted cylinders, one arranged above the other and both revolving on rollers, said cylinders being divided into compartments, having perforations of different sizes, by division plates which permit the successive discharge of the coffee from one compartment to the next, and the first or inlet compartment of the upper cylinder being so perforated as to discharge about half of the incoming coffee, a receiving compartment below said first or inlet compartment of said upper cylinder, a conveyer in said receiving compartment, a chute connecting said receiving compartment with the first or inlet compartment of the lower cylinder, and connections whereby the coffee discharged from certain sections of the upper cylinder may be mingled with the coffee discharged from certain sections of the lower cylinder.

In testimony whereof I have signed my name to this specification in the presence of two subscribing witnesses.

ROBERTO OKRASSA.

Witnesses:
AUGUSTO SCHAROTH,
M. BOISSIÈRE.

Copies of this patent may be obtained for five cents each, by addressing the "Commissioner of Patents, Washington, D. C."